Oct. 30, 1923.  
J. P. METZGER  
1,472,662  
COMBINED PRESSURE REGULATING AND GOVERNING APPARATUS  
Filed July 13, 1920  2 Sheets-Sheet 1

WITNESSES  
INVENTOR  
JULES P. METZGER  
BY  
ATTORNEYS

Oct. 30, 1923.
J. P. METZGER
1,472,662
COMBINED PRESSURE REGULATING AND GOVERNING APPARATUS
Filed July 13, 1920
2 Sheets-Sheet 2
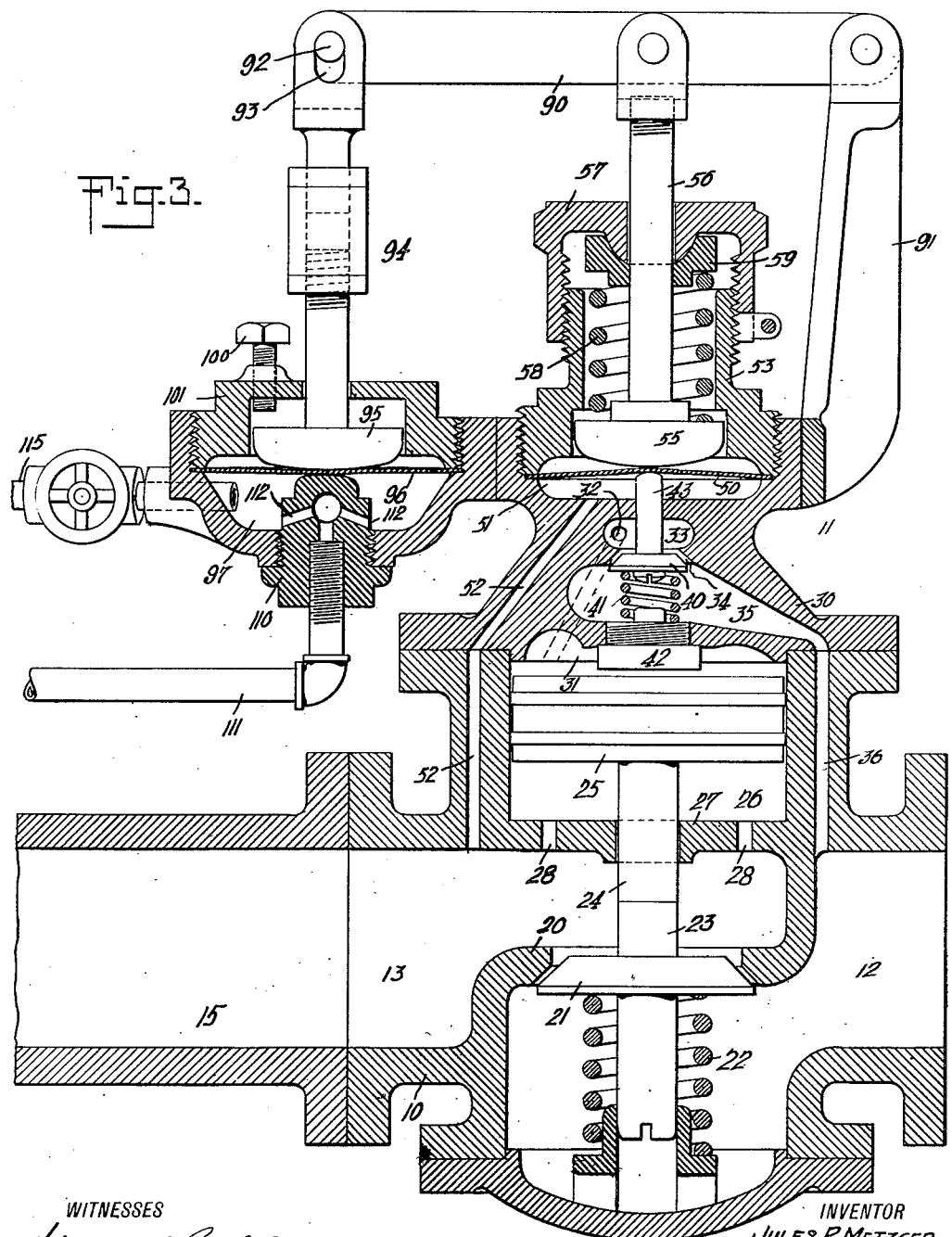
WITNESSES
INVENTOR
JULES P. METZGER
BY
ATTORNEYS Patented Oct. 30, 1923.

1,472,662

UNITED STATES PATENT OFFICE.

JULES P. METZGER, OF CARLSTADT, NEW JERSEY, ASSIGNOR TO THE LESLIE COMPANY, OF LYNDHURST, NEW JERSEY, A CORPORATION OF NEW JERSEY.

COMBINED PRESSURE REGULATING AND GOVERNING APPARATUS.

Original application filed January 14, 1920, Serial No. 351,352. Patent No. 1,369,690, dated February 22, 1921. Divided and this application filed July 13, 1920. Serial No. 395,986.

*To all whom it may concern:*

Be it known that I, JULES P. METZGER, a citizen of the United States, and a resident of Carlstadt, in the county of Bergen and State of New Jersey, have invented a new and Improved Combined Pressure Regulating and Governing Apparatus, of which the following is a full, clear, and exact description, this being a division of the application for Letters Patent, Serial No. 351,352, filed by me on January 14, 1920, which matured into a patent, 1,369,690, Feb. 22, 1921.

The invention relates to pressure regulators such as shown and described in the Letters Patent of the United States, No. 1,244,226 and No. 1,308,638, granted to me on October 23, 1917, and July 1, 1919, respectively.

The object of the present invention is to provide a new and improved combined pressure regulating and governing apparatus arranged to insure the accurate functioning of the apparatus as a regulator, and after it has been set to a predetermined pressure, and to provide a governing function for co-ordinating or sub-controlling the regulator without interfering with the accuracy thereof in the performance of its work as a regulator.

Another object is to render the pressure regulating and governing apparatus exceedingly sensitive and dispensing entirely with packings, glands, stuffing boxes and other devices producing frictional resistance.

Another object is to permit of adjusting the governing device wholly independently of the regulating device.

Another object is to permit the regulating device to function wholly independently of the governing device in case of repairs or the like.

Another object is to provide a regulating and governing apparatus which is simple and durable in construction, easy of inspection and not liable to get easily out of order.

With these and other objects in view, the invention consists of certain novel features of construction, as hereinafter shown and described and then specifically pointed out in the claims.

A practical embodiment of the invention is represented in the accompanying drawings forming a part of this specification, in which similar characters of reference indicate corresponding parts in all the views.

Figure 3 is an enlarged sectional side elevation of the improved combined pressure regulating and governing apparatus.

Figure 1:
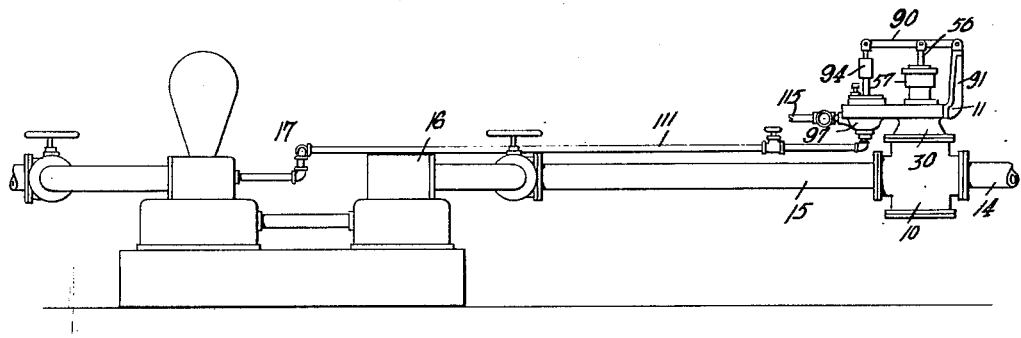
Figure 1 is a side elevation of the improved combined regulating and governing apparatus as applied to a pump.

The combined pressure regulating and governing apparatus presently to be described in detail relates to a general class of pressure regulators and governing devices in which the fluid delivered is at a predetermined pressure and the devices are intended for use in various developments of steam engineering service, and the improved apparatus applies wherever fluid pressure is to be delivered and governed. The apparatus is capable to be used in power plants, marine and naval engineering, also, in many cases, in industrial plants of various natures wherever steam is used to operate air compressors, pumps, etc., or for heating boiling apparatus such as steam vats, vacuum pans, etc. The improved apparatus is capable to be used, in some instances, for several purposes. It is intended as an automatic device but may be rendered semi-automatic only, or hand operated, should conditions require it. The apparatus may be reduced or reverted to perform solely the functions of an automatic pressure regulator. By this connection the fluid pressure chamber, which sub-controls and co-ordinates with the pressure regulator proper and the regulator, may be shut off even manually without tampering with its predetermined setting of pressure.

The body 10 of the pressure regulator 11 is provided at one side with an inlet 12 and at the other side with an outlet 13, and the said inlet 12 is connected by a pipe 14 with a boiler or other source of motive agent supply. The outlet 13 is connected by a pipe 15 with steam chests 16 of a duplex steam pump 17 of any approved construction, but it is expressly understood that I do not limit myself to this particular application of the combined regulating and governing apparatus. A valve seat 20 within the body 10 connects the inlet 12 with the outlet 13, and this valve seat 20 is controlled by a valve 21 normally held to its seat by a light spring 22. The upper end of the stem 23 of the valve 21 is connected with the stem 24 of a piston 25 mounted to reciprocate in a cylinder 26 formed within the body 10 and separated from the outlet by a horizontal partition 27 having openings or ports 28 to connect the lower end of the cylinder 26 with the outlet 13. The upper end of the cylinder 26 is closed by a cap 30 provided at the under side with a recess 31 connected by one or omore ports 32 with a chamber 33 arranged in the cap 30. The chamber 33 is provided at the under side with a valve seat 34 opening into an expansion chamber 35 formed in the cap 30 and connected by a port 36 with the inlet 12 of the valve body 10. The valve seat 34 is normally closed by a controlling valve 40 extending within the expansion chamber 35 and pressed to its seat by a spring 41 seated on the top of a screw plug 42 screwing in the bottom of the expansion chamber 35. The upwardly extending stem 43 of the controlling valve 40 is engaged at its upper end by a diaphragm 50 held in a diaphragm chamber 51 arranged in the top of the cap 30 and connected by a port or opening 52 with the outlet 13 of the body 10. The diaphragm 50 is fastened in position by a nipple 53 screwed or otherwise secured to the top of the cap 30. The top of the diaphragm 50 is normally pressed on by the lower enlarged end 55 of a rod or stem 56 extending centrally in the nipple 53 and passing through a cap 57 screwed or otherwise secured to the nipple 53. On the lower end or head 55 of the rod or stem 56 rests the lower end of a spring 58 extending within the nipple 53 and engaging a seat 59 swiveled on the under side of the cap 57. By screwing the cap 57 down or up on the nipple 53 the tension of the spring 58 can be regulated, and after the desired adjustment is made the cap 57 can be locked and sealed by a suitable locking and sealing device, if it is desired to do so. It is understood that by the arrangement described a set spring device is provided whereby the diaphragm 50 is alive, lively and resilient at all times.

So far the construction is substantially the same as that illustrated in my prior Letters Patent No. 1,308,638. However, it will be seen that a further auxiliary regulating chamber casing provides a diaphragm chamber 97 which is rigidly secured to a cap 30 thereby forming a regulating apparatus which embraces two diaphragm chambers, each housing a diaphragm independent of the other, co-ordinating together, each one flexible with the other, although casing is connected to regulator rigidly. The main regulator in operation has steam or fluid pressure acting under the diaphragm from the outlet 13, and the auxiliary chamber has water or fluid pressure acting under the diaphragm from the pipe 111. The regulator diaphragm has its upper surface acted upon by a head 55 connected to a stem 56 which extends through cap 57 and the same head is acted upon by an adjustable spring device to provide means co-operating with said head, and counteracting the pressure under the diaphragm. The auxiliary regulator also has a stem 94 connected to a head 95 which acts on the top of the diaphragm 96. Atached to cap 30 is a bracket 91 and an equalizing lever fulcrumed on said bracket, it being noted that this lever is pivotally connected at one end with the stem 94 by means of a pin and slot connection 92 and 93 to thus co-operate with the auxiliary regulator, as well as the stem 56 of the regulator.

Figure 2:
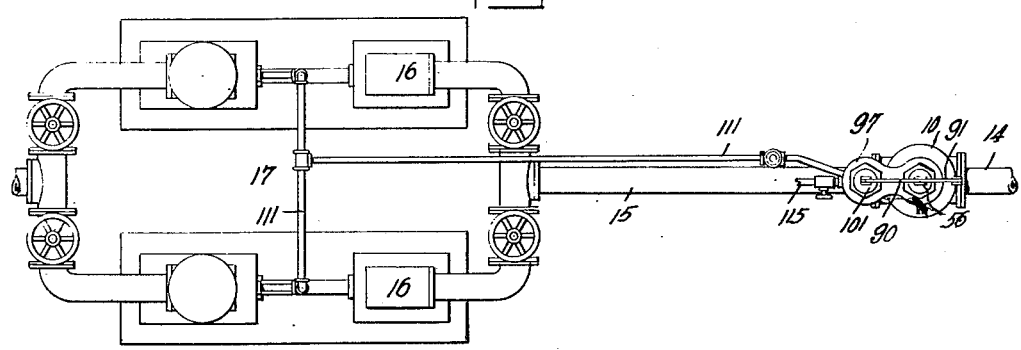
Figure 2 is a plan view of the same.

The operation of the regulator, proper, assuming that the initial pressure is supplied by a boiler (not shown) the fluid under pressure is passed through the regulator. Assuming that this fluid is steam and is operating for example a pump, which pump is called upon to meet a great variety of conditions, it will be understood that the auxiliary governor enables an operator to secure better results, and is capable of modifying the action of the regulator to suit many conditions in practice that could not otherwise be obtained. For instance, assuming as in Figures 1 and 2, that the inlet 12 of the regulator is connected to the source of supply 14, the fluid pressure will flow through ports 36 and into expansion chamber 35. If the spring device of the pressure regulator is now set by screwing down the cap 57 this action will force the diaphragm 50 to the head 55 which will contact with the same. The pilot valve 40 will be opened and steam will pass through the expansion chamber 35 through the chamber 33 and port 32 to the top of piston 25. Incident to the fact that the latter is of a larger area than the main valve 21 it will be forced down and open the said valve so as to admit steam to the outlet 13 and to the pump steam cylinder 16. At the same time steam pressure will leave through the port 52 to the underside of the diaphragm 50, and react to produce equilibrium with a spring adjusting device acting on the top of the diaphragm. Therefore the predetermined pressure set by the adjusting device is maintained and a normal predetermined steam pressure is led to the pump cylinder 16. Thus far the operation is in accordance with the patent afore referred to.

However, considering the regulator working as above, and as in Figure 3, it will be noted that the auxiliary regulator might not be effected on the equilibrium lever 90 being in a neutral position, and with ordinary conditions of service the regulator itself will operate the pump with sufficient accurate function and without even connecting the auxiliary regulator with the pump discharge 111. Assuming that a great range of variations is demanded in the pump either in volume or pressure it will be understood that by maintaining the pump discharge pipe 111 with the under side of the diaphragm 96 that water will be admitted under the diaphragm and it will not in the position shown, affect the regulator proper in view of the fact that the stop 100 will not permit the stem 94 to effect the lever 90 in view of the allowance in the slot and pin connection. Now assuming that a greater volume of water is desired for an emergency or additional work, etc. the adjusting device of the regulator may be screwed down so that the regulator will feed the greatest amount of steam to operate the pumps and the auxiliary adjustable regulator stem 94 lengthened or shortened to a corresponding extent so that the discharge volume or pressure will, while allowed to meet the requirements desired, if exceeded, force the diaphragm 96 up as well as the stem 94 and lever 90 and thereby the stem 56 will be raised to release and modify the opening of the controlling valve 40.

It will be seen that the auxiliary regulating means may be used to modify the said operation means of the regulator and this regulator auxiliary means, incident to being capable of adjustment, varies and attains results more accurate under varying conditions; it is obvious that the stop 100 and adjustable stem 94 co-operate to permit of the regulator action being arranged, and finally in fact this connection may be made neutral by varying the lag, by locating the pin in the middle of slot 93.

The construction thus far described is substantially the same as the one illustrated in connection with my prior Letters Patent No. 1,380,638. The rod or stem 56 projects a distance above the top of the cap 57 and is pivotally connected with an equalizing lever 90 intermediate the end thereof, the said equalizing lever 90 forming part of a governing device arranged as follows: One end of the equalizing lever is fulcrumed on a bracket 91 attached to the cap 30, and the other end of the equalizing lever is provided with a pivot 92 engaging a slot 93 formed in the upper end of an adjustable rod or stem 94 having its lower enlarged end 95 resting on top of a diaphragm 96 held in a fluid chamber 97 attached to or formed on the cap 30. It will be noticed that in this case the rod or stem 94 can be lengthened or shortened and in addition a lagging means is provided by the slot 93 engaged by the pivot 92. An adjustable stop 100 is provided to limit the upward movement of the rod or stem 94 and the diaphragm 96 to exactly predetermine the movement of the rod or stem 94. The stop 100 is preferably in the form of a screw rod screwing in the cap 101 of the chamber 97. It will be noticed that in this case the lifting of the diaphragm 96 is exactly predetermined to respond to the variable conditions of pressure desired in co-ordination with the said pressure regulator 11.

When using the apparatus as a pump regulator, the stop 110 for the diaphragm 96 is in the form of a screw plug and is connected by a pipe 111 with the water chamber of the pump so that water passes into the chamber 97 by way of the pipe 111 and ports 112 formed in the upper end of the plug 110 and discharging the water into the chamber 97 uniformly and in a downward direction to prevent direct impulse of the fluid against the under side of the diaphragm 96. It will be noticed that the plug 110 can be readily unscrewed to permit of inspecting the same. A valved pipe 115 leading from an oil supply is preferably connected with the chamber 97 to admit oil on top of the water in the chamber with a view of cushioning the diaphragm 96. It often happens in practice that the regulator 11 is made to feed various pumps and in some cases is made to work intermittently. This working causes vibration and the water produces a ramming action when one or more of the pumps are shut off or put back into service. It is evident that the most exact device is necessary in such cases and the regulator is required to work very close to the predetermined pressure of steam at which it is set or otherwise the results above referred to will be aggravated and become very serious. With the improvement described the adjustment will prevent any of the variations to sensibly affect the regulator owing to the proper amount of variable lag movement which is provided by the connection of the rod or stem 94 with the equalizing lever besides the adjustment of the rod or stem itself.

It is understood that I do not limit myself to the particular use of the regulating and governing apparatus as shown and described as the apparatus is applicable as a most efficient fluid or air governing device of any kind.

It is also evident that it may be applied, for instance, for setting the predetermined pressure of any receiver of steam, air or fluid, setting first the fluid chamber at a pressure carried in the receiver, and the regulator in accordance with the same will supply the fluid of the pressure to the receiver and maintain the same, irrespective of outlet pressure at throat of regulator. This in many cases is important where, for instance, receiver or fluid chamber connecting is located far from the regulator. It will take, in this way, care of drop of pressure due to long line of pipe. It is evident that in this connection neither the springs nor the diaphragm need to be the same size in each fluid pressure chamber. In an apparatus of this kind it is necessary that every means possible be taken to prevent them from getting out of order, and therefore must be simple of construction, must be capable of easy inspection, and they must, above all, be sensitive and as responsive to any change of working conditions as it is possible to make a device.

This is of paramount importance when the result is considered, not only to property but even to life, should an apparatus of this kind fail to work when depended upon. Engines, pumps and receivers of the largest power plants might be destroyed. While this device is usable with low pressures it is identified and intended to apply to high pressures and in many cases very large receivers and, therefore, the importance of my application, in view of the facts stated above, is readily seen, as no stuffing box of any kind, either under steam or any other fluid connection is used to reduce the sensitiveness of the apparatus, allowing an absolute free movement of the parts. It is as sensitive as a scale, as all parts governing impulse are in equalization.

The important condition of the principle of this improvement is that the two diaphragms, although acting and co-ordinating together to accomplish the functions required, are not rigidly connected, but located side by side, each one is independent in its movement therefore flexible and resilient, made of different material, if necessary. In setting the adjusting device whatever difference may be in their resiliency, due to the causes referred to being connected through resilient spring members, the highest flexibility that can be produced is obtained, the co-ordination of all the parts making this possible, and, therefore, a most sensitive device is made, suitable to most conditions met in service.

It is evident that by the arrangement shown and described, a combined regulating and governing apparatus is provided comprising a fluid pressure regulator which controls a fluid under pressure, and a governing device which is controlled by another fluid, but the latter is resultant from the activity of the regulator controlled fluid.

Having thus described my invention, I claim as new and desire to secure by Letters Patent:—

1. A device of the character described including a pressure regulating apparatus adapted to control a fluid under pressure, means for adjustably setting the regulator to act at a predetermined pressure, a governing device adapted to be controlled by fluid, an equalizing lever connected to said adjustable regulator means, and an adjustable lagging action between said lever and said governing device.

2. A device of the character described including a pressure regulating device, a diaphragm controlling the actuation of said device, a casing, a second diaphragm within said casing, regulating means associated with said first named device, an adjustable stop associated with said second diaphragm, a lever connecting said diaphragms, said diaphragms being adapted to have fluid pressure acting upon one of their faces.

3. A device of the character described including a pressure regulator, a diaphragm controlling the operation of said regulator, an adjustably connected spring co-operating with said diaphragm, a casing, a second diaphragm within said casing, contacting and equalizing means arranged between said diaphragms, said means being capable of independent adjustment, and stop means co-operating with said device to limit the movements of the parts thereof.

JULES P. METZGER.